US005933312A

United States Patent [19]

Schuhbauer et al.

[11] Patent Number: 5,933,312

[45] Date of Patent: Aug. 3, 1999

[54] FREE-WHEEL CIRCUIT WITH AN ADJUSTABLE OFF DELAY TIME

[75] Inventors: Thomas Schuhbauer, Neunburg; Bernhard Streich, Amberg, both of Germany

[73] Assignee: Siemens Aktiengesellschaft, München, Germany

[21] Appl. No.: 08/945,920

[22] PCT Filed: May 23, 1996

[86] PCT No.: PCT/DE96/00899

§ 371 Date: Mar. 10, 1998

§ 102(e) Date: Mar. 10, 1998

[87] PCT Pub. No.: WO96/38893

PCT Pub. Date: Dec. 5, 1996

[30] Foreign Application Priority Data

May 30, 1995 [DE] Germany ........................... 195 19 757

[51] Int. Cl.$^{6}$ ............................. H02H 9/04; H01H 47/22

[52] U.S. Cl. ........................... 361/152; 361/159; 361/160

[58] Field of Search .................................... 361/152, 154, 361/159, 160; 307/130

[56] References Cited

U.S. PATENT DOCUMENTS 5,557,494 9/1996 Ishikawa et al. ....................... 361/152

5,671,115 9/1997 Streich .................................... 361/154

FOREIGN PATENT DOCUMENTS 33 17 942 11/1984 Germany .

42 29 440 3/1994 Germany .

94 09 760 10/1994 Germany .

43 21 127 1/1995 Germany .

*Primary Examiner*—Fritz Fleming

*Attorney, Agent, or Firm*—Kenyon & Kenyon

[57] ABSTRACT

The magnetic residual energy stored in a coil is made to decay within a shorter and/or definite time period by the use of a free-wheeling circuit connected in parallel. The free-wheeling circuit comprises a series circuit, which includes a first diode and a first switching transistor connected in parallel to a non-linear resistor, connected in parallel to the coil. The first switching transistor is driven by a parallel circuit formed by a capacitor and a first ohmic resistor, which is connected in parallel to a second switching transistor. When a switch-off overvoltage appears in the coil, the second switching transistor becomes conductive and thus the first switching transistor is reliably blocked, so that the residual energy decays through the non-linear resistor.

3 Claims, 1 Drawing Sheet

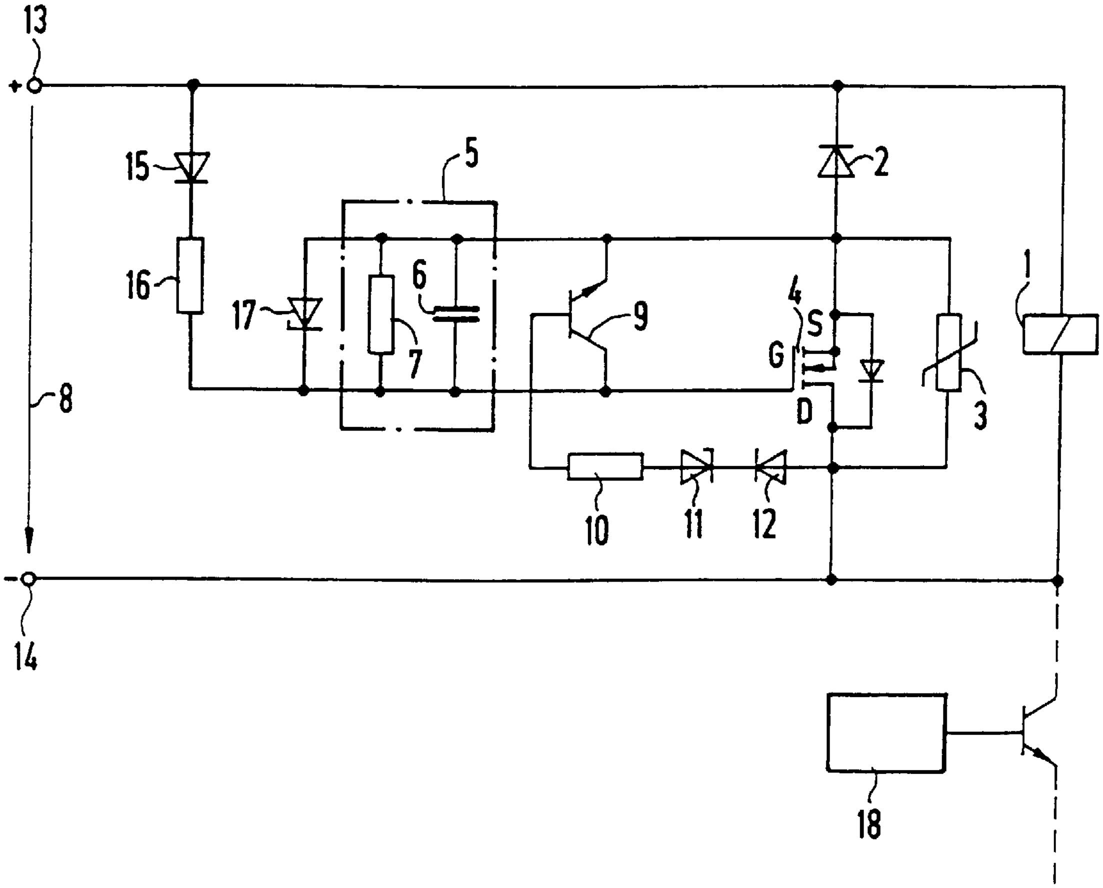
13
15
16
17
5
6
7
9
4
S
G
D
2
1
3
8
10
11
12
14
18

FREE-WHEEL CIRCUIT WITH AN ADJUSTABLE OFF DELAY TIME

FIELD OF THE INVENTION

The present invention is directed to a free-wheel circuit for eliminating a magnetic residual energy stored in a coil within a predetermined time.

BACKGROUND INFORMATION

German Patent No. 33 17 942 C2 describes a circuit arrangement for the protection of mechanical switchgear by an electronic switch. The mechanical switchgear assemblies are connected in series with ohmic inductive loads that are supplied with direct current. In this context, the electronic switch can be controlled by a capacitor that is charged from the load voltage. The electronic switch is connected in parallel to the load and becomes conductive when the switchgear is turned off. A non-linear resistor is connected in parallel to the electronic switch, and the parallel circuit is in turn connected in parallel to the load. The circuit arrangement operates in a manner similar to a free-wheeling diode connected in parallel to the load. As long as a control supply voltage source is connected to the load, the capacitor is charged and the electronic switch is conductive. As soon as the control voltage source is isolated from the load, the capacitor is discharged, resulting in the electronic switch becoming non-conductive. The current still flowing through the ohmic inductive load due to the stored magnetic energy is switched to the non-linear resistor by the electronic switch, resulting in a quick final decay of the residual energy stored in the inductance.

Such ohmic inductive loads include, for example, contactor coils supplied with direct current by a control supply voltage source, Depending on the size of the contactor and of the contactor coil used, decay times of 100 to 300 msec are obtained, which is still relatively slow for the requirements.

German Utility Model No. 94 09 760.7 describes a circuit arrangement for actuating a contactor. A free-wheeling branch, comprising a switching transistor and a free-wheeling diode connected in series thereto, is connected in parallel to the contactor coil. A free-wheeling controller controls the switching transistor as a function of the shape of the control voltage.

Furthermore, German Published Patent Application No. 43 21 127 describes a device for activating an electromagnetic load. This device comprises a series connection of the electromagnetic load with a first switching means, a free-wheeling circuit for the electromagnetic load, comprising a second switching means, and an actuator means for the switching means.

SUMMARY OF THE INVENTION

An object of the present invention is to provide a free-wheeling circuit that will eliminate the magnetic energy stored in a coil, in general of an ohmic inductive load connected in parallel, within a shorter predetermined time period after it is disconnected from a control supply voltage source. The use of such a free-wheeling circuit for contactors allows a shorter, definite decay of the contactor. An advantage of this free-wheeling circuit consists of its self-controlled action resulting from the fact that, when switch-off surges occur in the coil, the free-wheeling transistor is reliably blocked and thus the current flow is switched to the non-linear resistor.

The present invention provides a free-wheel circuit that includes a series circuit that is parallel to the coil. The series circuit includes a first diode and a first switching transistor with which a non-linear resistor is connected in parallel. The free-wheel circuit of the present invention also includes a parallel circuit for driving the first switching transistor, the parallel circuit including a capacitor and a first ohmic resistor with which a second switching transistor is connected in parallel. According to the free-wheel circuit of the present invention, the residual magnetic energy of the coil is eliminated via the non-linear resistor.

BRIEF DESCRIPTION OF THE DRAWING

The drawing illustrates a free-wheeling circuit connected to a coil, in accordance with the present invention.

DETAILED DESCRIPTION

The drawing shows a free-wheeling circuit connected in parallel to a coil 1. This parallel circuit is connected to a control supply voltage source 8 with a positive pole 13 and a negative pole 14. The free-wheeling circuit comprises a series circuit that is parallel to coil 1; this series circuit comprises a first diode 2 and a first switching transistor 4, connected in parallel to a non-linear resistor 3. Drain terminal D of switching transistor 4 is connected to negative pole 14, and its source terminal S is connected to the anode of the first diode 2, which in turn is connected, with its cathode terminal, to positive pole 13. Positive pole 13 is connected to the gate terminal G of first switching transistor 4 through a third diode 15 and a third ohmic resistor 16 connected in series thereto.

A parallel circuit 5 comprising ohmic resistor 7 and capacitor 6 is connected between source terminal S and gate terminal G of first switching transistor 4. The parallel circuit 5 is connected in parallel to a first Zener diode 17 and a second switching transistor 9, which is connected to source terminal S of first switching transistor 4 with its emitter and to gate terminal G of said switching transistor with its collector. The base of second switching transistor 9 is connected to the negative pole 14 via a series circuit formed by a second ohmic resistor 10, a second Zener diode 11, and a second diode 12; the anode terminal of the second diode 12 is also connected to negative pole 14, and the two cathode terminals of the second diode 12 and the second Zener diode 11 are connected to one another.

Coil 1 may comprise, for example, a contactor coil, which can be connected in series with an electronic driver 18 as illustrated.

Control supply voltage source 8 is a DC voltage source supplying to coil 1, or in general, an ohmic inductive load. At the same time, the circuit, connected in series, formed by first Zener diode 17, first ohmic resistor 7, and capacitor 6, connected in parallel, is supplied with a control voltage via diode 15 and ohmic resistor 16. The control voltage causes first switching transistor 4 to become conductive and remain so as long as control supply voltage source 8 is connected. When control supply voltage source 8 is switched off, the control voltage decays slowly from first switching transistor 4 according to the time constant given by parallel circuit 5 until it reaches a value at which first switching transistor 4 becomes non-conductive. To avoid the unstable condition of first switching transistor 4 in its linear range, reliable blocking of first switching transistor 4 operating as a free-wheeling transistor is ensured by second switching transistor 9.

The diode circuit of the second switching transistor 9 comprising second ohmic resistor 10, second Zener diode 11, and second diode 12 is used to make second switching transistor 9 reliably conductive. This is done by short-circuiting the gate-source segment of first switching transistor 4, thereby blocking first switching transistor 4 when overvoltages occur in coil 1. These overvoltages appear when the first switching transistor 4 operates in the linear range.

Non-linear resistor 3 is used to protect the drain-source segment of first switching transistor 4. It causes the switch-off overvoltages produced in coil 1 when control supply voltage source 8 is turned off and protects first switching transistor 4 from being destroyed.

The residual energy stored in coil 1 can decay at a higher or lower rate or the switch-off delay of the contactor can be set as desired when a contactor coil is used with variants of the first ohmic resistor 7 and capacitor 6. This is possible up to the maximum switch-off delay with which the contactor would decay without the circuit.

By dimensioning first diode 2, which is also referred to as a free-wheeling diode, first switching transistor 4, and non-linear resistor 3, the circuit can be adapted to a variety of electromagnetic drivers.

The free-wheeling circuit can also be used for an electronically clocked coil driver 18.

Compared to previously known circuit arrangements, the free-wheeling circuit described herein is considerably simpler and contains fewer components.

Of course, another switching transistor type can also be used in place of first switching transistor 4 and second switching transistor 9.

What is claimed is:

1. A free-wheeling circuit for eliminating a magnetic residual energy stored in a coil, comprising:

a first series circuit connected in parallel to the coil, the series circuit including a first diode connected to a non-linear resistor;

a first switching transistor connected in parallel to the non-linear resistor;

a parallel circuit for driving the first switching transistor, the parallel circuit including a capacitor connected to a first ohmic resistor, the parallel circuit connected to a control input of the first switching transistor and to a control supply voltage source; and a second switching transistor connected in parallel to the parallel circuit, wherein, when the control supply voltage source is turned off in order to produce a switch-off overvoltage in the coil, the second switching transistor becomes conductive and the first switching transistor is blocked.

2. The free-wheeling circuit according to claim 1, further comprising an arrangement for short-circuiting a first terminal of the first switching transistor to a second terminal of the first switching transistor.

3. A free-wheeling circuit for eliminating a magnetic residual energy stored in a coil, comprising:

a first series circuit coupled in parallel to the coil, the series circuit including a first diode coupled to a non-linear resistor;

a first switching transistor coupled in parallel to the non-linear resistor;

a parallel circuit for driving the first switching transistor, the parallel circuit including a capacitor coupled to a first ohmic resistor, the parallel circuit coupled to a control input of the first switching transistor and to a control supply voltage source; and a second switching transistor coupled in parallel to the parallel circuit, wherein, when a switch-off overvoltage occurs in the coil, the second switching transistor becomes conductive and the first switching transistor is blocked, wherein the second switching transistor is coupled to a driver circuit, wherein the driver circuit includes a second series circuit comprising a second ohmic resistor, a Zener diode coupled to the second ohmic resistor, and a second diode coupled to the Zener diode, the Zener diode and the second diode being coupled to each other with opposite polarities.

* * * * *